United States Patent [19] [11] 4,115,477
Morris [45] Sep. 19, 1978

[54] PROCESS FOR RECOVERING GRAFT COPOLYMERS LATEX SOLIDS WHEREIN A FINES FRACTION IS RECYCLED AND INCORPORATED IN SAID SOLIDS

[75] Inventor: Alonzo E. Morris, Cincinnati, Ohio

[73] Assignee: Monsanto Company, St. Louis, Mo.

[21] Appl. No.: 833,836

[22] Filed: Sep. 16, 1977

[51] Int. Cl.² ........................................... C08F 279/06
[52] U.S. Cl. .............................................. 260/880 R
[58] Field of Search ........................... 260/880 R, 879

[56] References Cited

U.S. PATENT DOCUMENTS 3,345,340  10/1967  Simon ............................ 260/880 R Primary Examiner—Paul R. Michl
Attorney, Agent, or Firm—Joseph S. Nelson; William J. Farrington; James C. Logomasini

[57] ABSTRACT

This invention relates to a process for recovering graft copolymer solids from a latex wherein a portion of said solids are separated as a fines-fraction and recycled to said latex for incorporation in said solids particles, hence, substantially reducing the fines-fraction of said solids enabling efficient drying of said solids particles.

22 Claims, No Drawings

PROCESS FOR RECOVERING GRAFT COPOLYMERS LATEX SOLIDS WHEREIN A FINES FRACTION IS RECYCLED AND INCORPORATED IN SAID SOLIDS

BACKGROUND OF THE INVENTION

In the recovery of latex solids, it is usually necessary or desirable to conduct the process so that the recovered solids will be substantially free of moisture and contaminants, such as emulsifying agents and water-soluble salts, and will have a particle size and particle size distribution suitable for subsequent compounding operations. In commercial-scale operations, of course, it is also desirable to conduct the process as economically as possible.

Many known techniques permit the efficient, economical recovery of high quality (i.e., substantially moisture and contaminant-free, suitable particle size) rubber solids from latices, but, as is well known, it is difficult to recover high quality solids from latices of polymers having heat distortion temperatures above 0° C., without utilizing expensive and sometimes unduly time-consuming procedures. Thus, when known techniques are used to recover these resinous polymers from latices, it is frequently found that:

(1) The techniques which permit facile, adequate removal of water and contaminants lead to the formation of a high percentage of particles which are smaller than 60 mesh (designated as "fines-fraction") creating problems because (a) in the case of many polymers, an explosion hazard is created by a high concentration of fines in efficient drying equipment, (b) compounding problems are presented when a polymer which is to be mixed with one or more additives contains too high a percentage of fines, and (c) it is uneconomical to separate and discard the fines in order to avoid the problems which their presence creates.

(2) The techniques which insure a minimum formation of fines make it at least very difficult to accomplish adequate removal of water and contaminants-disadvantageous because of (a) processing problems presented when the polymer has too high a moisture content, (b) the deleterious effect of the contaminants on polymer properties, and (c) the expense of the equipment required to remove the difficulty-removable water and contaminants.

(3) The larger amounts of water usually present in the coagulum when it is fed to a drier necessitates the use of driers having a large load capacity-disadvantageous because of the greater expense of the larger load capacity driers.

An object of the invention is to provide a novel process for recovering latex solids.

Another object is to provide a process which permits the economical recovery of substantially moisture-free polymers having a desirable particle size and particle size distribution from latices of polymers having heat distortion temperatures above 0° C.

Another objective is to provide an improved process wherein a fines-fraction of the polymeric particles is separated and recycled to said latex for incorporation in said solids particles.

U.S. Pat. No. 3,345,430 discloses a process for recovering graft copolymer latex solids having a reduced fines-fraction by coagulating said solids followed by synerizing and hardening said solids to reduce break-up during washing, granulation and drying, however, although the fines-fraction is reduced, further reduction has been found necessary to increase drying efficiency. The present invention provides a novel improved process wherein said fines-fraction is recycled and incorporated in said solids particles producing a more desirable particle size and particle-size distribution for drying and subsequent processing.

SUMMARY OF THE INVENTION

These and other objectives are accomplished by the present process which relates to an improved process for recovering solids with a reduced fines-fraction from an aqueous polymeric latex comprising a grafted conjugated diene polymer, wherein said diene polymer is a substrate grafted with a superstrate polymer of a monomer formulation comprising a monovinylidene aromatic and an acrylic monomer, wherein said process comprises: (a) mixing said latex with an aqueous electrolyte solution until a homogeneous form-sustaining paste is obtained, (b) forming said paste into at least one shaped unit, (c) heating said shaped paste unit in an aqueous medium maintained at a temperature at least as high as the heat distortion temperature of the superstrate polymer to synerize and harden said paste units into polymeric particles, (d) removing said polymer particles from said aqueous medium, and (e) drying said particles, the improvement which comprises:

(f) separating a portion of said polymer particles as a fines-fraction in step (d) and (g) dispersing said fines-fraction into at least a portion of said latex at a location prior to step (a), maintaining the rate of dispersion in step (g) at a rate sufficient to recycle a predetermined amount of said fines-fraction separated in step (f).

DESCRIPTION OF THE PREFERRED EMBODIMENTS

In the practice of the invention, solids are recovered from a polymeric latex by intimately mixing the latex with an aqueous solution of an electrolyte until a homogeneous, form-sustaining paste is obtained, forming the paste into one or more shaped units having a minimum cross-sectional dimension of about 0.05 inch and heating the shaped paste in an aqueous bath maintained at a temperature at least as high as the heat distortion temperature of the polymer and synerize the polymer particles prior to granulating the polymer, if necessary, to a particle size suitable for washing and drying and for subsequent compounding operations, and then washing and drying the polymer by conventional techniques.

The polymer particles are separated from the aqueous bath by screening or by other conventional means such as, e.g. centrifuging. Preferably, the particles are screened out on a screen of about 60 mesh which allows the fines-fraction of (−60) and fine mesh sizes, e.g. (−200) to pass through and be collected on a filter means such as a continuous vacuum filter which can be a drum, disk or horizontal type vacuum filter commonly used commercially. The filtering surface for such filters are conventionally, a fine woven cloth or wire mesh material. The slurry of solids is moved to said surface and the solids are deposited as a cake under the impetus of a vacuum. The cake can be removed by commonly used mechanical or pneumatic means and can be dispersed in the latex by conventional stirring in a stirred tank sufficient to form a uniform mixture with the latex as an aqueous slurry. Here, the emulsifier in the latex aids in slurrying said fines-fraction. Additional emulsifying agents can be added to stabilize the slurry, e.g. in batch operations or continuous operations.

Preferably, the fines-fraction is dispersed continuously in at least a portion of said latex stream being fed to the coagulation step. The fines-fraction can be washed on said vacuum filter and finally washed off or mechanically removed from said filter into an aqueous slurry to be dispersed in said latex in a conventional stirred tank or be fed as a separate stream into said latex feed and dispersed by in-line mixing in a conduit or a conventional static or mechanical pipe-mixing means.

The fines-fraction separated from said polymer particles may vary from about 1.0 to 20% by weight of said polymeric particles or higher up to 40%. The rate of dispersion of said fines-fraction in said latex is preferably at a rate sufficient to recycle said fines-fraction at the rate separated to provide efficient recovery and recycle of the fines-fraction. Processwise, the fines-fraction can be recycled to said latex in proportions up to about 1 to 40% of said solids contained in said latex continuously, incrementally or batchwise.

These latices contain emulsifying agent, e.g., fatty acid soaps, which keep the polymer particles dispersed in the aqueous medium until the latex and electrolyte are mixed, and they frequently contain optional additives such as antioxidants, heat and light stabilizers, pigments, dyes, etc.

A preferred embodiment of the invention is its use in recovering solids from:

A latex of a graft copolymer of (a) a monovinylidene aromatic monomer such as styrene; ar-alkylstyrenes, e.g., o-, m-, and p-methylstyrenes, 2,5-dimethylstyrene, p-butylstyrene, etc.; ar-halostyrenes, e.g., o-, m-, and p-chlorostyrenes, p-bromostyrene, 2,5-dichlorostyrene, 2-chloro-4-methylstyrene, etc.; alpha-alkylstyrenes such as alpha-methylstyrene; vinyl naphthalent; and mixtures thereof and/or (b) an acrylic monomer such as acrylonitrile; methacrylonitrile; a $C_1$–$C_4$ alkyl acrylate or methacrylate, e.g., methyl acrylate, butyl methacrylate, etc., and mixtures thereof on (c) a rubbery polymer of a conjugated 1,3-diene, e.g., natural rubber, homopolymers of butadiene, isoprene, chloroprene, etc., copolymers of two or more such dienes, copolymers of at least 50% by weight of one or more such dienes with one or more comonomers such as the monovinylidene aromatic monomers and acrylic monomers mentioned above or mixed latices of such graft copolymers.

A particularly preferred embodiment of the invention is its use in recovering solids from mixed latices of (A) a graft copolymer of (1) about 10 to 150 parts by weight of a mixture of 20–95% by weight of a monovinylidene aromatic monomer (especially styrene or a mixture of styrene and alpha-methylstyrene) and 80–5% by weight of an acrylic monomer (especially acrylonitrile) on (2) 100 parts by weight of a rubbery polymer of a conjugated 1,3-diene (especially a cross-linked butadiene polymer containing up to about 20% by weight of combined styrene and/or acrylonitrile).

The graft copolymer in said polymeric latex then is preferable a grafted conjugated diene polymer wherein said diene polymer is a substrate grafted with a superstrate polymer of a monomer formulation comprising a monovinylidene aromatic and an acrylic monomer wherein the heat distortion temperature of the superstrate is above about 65° C. in the range of from about 65° to 100° C. Said diene polymer is polybutadiene or copolymers of butadiene with styrene or acrylonitrile wherein said copolymers have about 50 to 97% by weight butadiene. The polymeric latex can contain from about 25 to 65%, preferably 30 to 50% by weight of grafted diene polymer. Said polymeric latex can be a mixture of a first and second grafted diene polymer wherein said first grafted diene polymer has about 10–40 parts of grafted superstrate polymer and said second grafted diene polymer having about 40 to 150 parts of superstrate per 100 parts of diene polymer. Said mixture of latices are preferably a mixture of from about 5 to 40 parts of said first graft diene polymer with about 60 to 95 parts of said second grafted diene polymer.

The electrolyte solution which is mixed with the polymeric latex can be an aqueous solution of any of the electrolytes conventionally used to coagulate such latices (e.g., inorganic acids such as hydrochloric acid, sulfuric acid, etc.; organic acids such as formic acid, oxalic acid, acetic acid, etc.; water-soluble metal salts such as the chlorides, nitrates, sulfates, and acetates of sodium, potassium, zinc, calcium, magnesium, aluminum, etc.), preferably an aqueous solution of a polyvalent metal salt.

As is well known, the amount of electrolyte solution required to coagulate a polymeric latex varies with several factors such as the particular electrolyte being used, the concentration of electrolyte in the solution, the solids content and particle size of the latex, the amount of emulsifying agent in the latex, etc. As will be readily understood, the solids content which the coagulum should have in order to be form-sustaining can vary with the particular polymeric latex being coagulated, and the degree of dilution of the electrolyte, required to permit intimate admixture of the latex and the electrolyte solution can vary with both the solids content of the latex and the particular technique employed to mix the latex and electrolyte. Thus, several variables determine the optimum amount of electrolyte solution to be mixed with the polymeric latex.

Particularly since the amount of electrolyte required for coagulation can be learned from the elctrolyte-coagulation techniques of the prior art, those skilled in the art should have no difficulty in determining the optimum amount of a particular electrolyte solution to mix with a particular polymeric latex in the practice of the present invention. However, as an added guide, it might be noted that (1) the amount of electrolyte employed should be sufficient to accomplish substantially complete coagulation of the latex, since the presence of more than about 5% free latex in the coagulum could make the paste non-homogeneous and lead to excessive formation of fines, (2) excessive amounts of electrolyte are preferably avoided, because the excess electrolyte makes the coagulation more rapid and difficult to control as well as adding to the degree of contamination of the coagulum, (3) the electrolyte solution should be sufficiently dilute to permit intimate admixture of the latex and electrolyte by the particular mixing technique employed in order to avoid the formation of anonhomogeneous coagulum, and (4) the electrolyte solution should be sufficiently concentrated to avoid the formation of a coagulum containing too much water to be form-sustaining, i.e., capable of being shaped and retaining the shape without the aid of a supporting structure. It is frequently found most convenient to coagulate the polymeric latex by mixing it with an aqueous solution containing about 0.5–5% by weight of an electrolyte in such proportions that the coagulum has a solids content of about 20–50% by weight. However, more or less concentrated electrolyte solutions and higher or lower solids contents in the coagulum are sometimes desirable, since the criticality with regard to the amounts of electrolyte and water employed is that they be such that the coagulum is a homogeneous, form-sustaining paste.

The latex and electrolyte solution can be mixed by any batch or continuous technique suitable for the production of a homogeneous, form-sustaining coagulum, i.e., a technique which accomplishes thorough admixture of the latex and electrolyte solution rapidly enough for a homogeneous coagulum to be formed. Regardless of the particular mixing technique employed, it is preferable to continue mixing only until a homogeneous, form-sustaining coagulum is obtained or at least not for any substantial period thereafter, because further working of the coagulum tends to soften the paste and leads to the formation of fines.

Suitable mixing techniques include, e.g., adding the electrolyte solution to the latex with vigorous agitation, continuously feeding separate charges of latex and electrolyte solution to a mixing chamber at rates such as to maintain a substantially constant latex/electrolyte solution ratio in the chamber and mixing the charges with vigorous agitation, etc. A particularly preferred technique (since it permits the necessarily rapid admixture of the latex and electrolyte solution to be accomplished under minimum shear conditions, thus minimizing fines formation, and also permits facil shaping of the coagulum) comprises continuously feeding the latex containing a dispersed fines-fraction and the electrolyte solution through separate inlets into an extruder-mixer having a simple, deep-flighted screw helix angle at rates such as to maintain a substantially constant latex-electrolyte solution ratio in the extruder and operating at a screw speed sufficient to accomplish thorough admixture of the latex and electrolyte solution during the residence time in the extruder. Other techniques suitable for the production of a homogeneous, form-sustaining coagulum will be obvious to those skilled in the art.

Preferably, the fines-fraction is dispersed in said latex at a station prior to the mixing with said aqueous electrolyte solution. Another operable method of recycling said fines-fraction is to feed said latex, said fines-fraction and said aqueous electrolyte solution simultaneously into an extruder means, mixing and coagulating said latex to incorporate said fines-fraction in a form-sustaining paste of said latex and extruding said paste through an orifice having a cross-section of at least 0.05 inches.

The homogeneous, form-sustaining paste is formed into one or more shaped units having a minimum cross-section of about 0.05 inch to make the coagulum more resistant to attrition during hardening and syneresis, thus minimizing fines formation. Since greater thickness of the shaped units makes them stronger, i.e., more resistant to attrition, there naturally is no limitation on the maximum dimension of the units. However, the longer time required to accomplish complete hardening and syneresis of the thicker shpaed units frequently makes it desirable to form the paste into shaped units having a cross-section of about 0.05–5 inches, preferably about 0.2–2 inches.

Since the particular shape imparted to the paste is not critical as long as the shaped units have a minimum cross-section of about 0.05 inch, the manner in which the paste is formed can be varied considerably, depending on the particular shape desired. Shaping can be accomplished, e.g., by pressing the paste through a plate or screen provided with circular, square or other shaped holes or by extruding the paste through an extruder having an exit orifice diameter of at least about 0.05 inch, an extruder having an exit orifice provided with a wire dicer having the wires spaced so as to form openings having the desired cross-section, an extruder provided with a die which imparts the desired configuration to the paste, etc. When a single shaped unit is desired, a support such as a moving belt must be provided at the exit orifice of the device, e.g., an extruder, employed to form the shaped unit, because the weight of the coagulum would otherwise cause the shaped unit to break into a plurality of shaped units, the length of which would depend on the cross-section of the unit and the nature of the forces acting on it. Actually, since a single shaped unit offers no advantage over a plurality of shaped units in the practice of the invention, a support for the shaped unit is not often employed unless it is also desired as a convenient means of conveying the shaped unit to the aqueous bath in which hardening and syneresis are to be accomplished.

Since shaping of the coagulum can be an inherent result of the coagulation technique (e.g., when an extruder having a suitable exit orifice is employed in the particularly preferred coagulation technique discussed above) and a shaping technique which causes considerable working of the coagulum (e.g., pressing the coagulum through the holes of a perforated plate) can accomplish at least the final stage of the formation of a homogeneous, form-sustaining coagulum, it is obvious that the coagulation and shaping steps of the present process are not mutually exclusive and that shaping of the coagulum can be begun before the latex and electrolyte solution have been mixed sufficiently for a homogeneous, form-sustaining paste to be obtained. It is, in fact, particularly desirable to have an overlapping between the coagulation and shaping steps when the shaping technique employed is one which causes considerable working of the coagulum, since further working of a coagulum which has already been worked to the stage of a homogeneous, form-sustaining paste tends to soften the paste and lead to the formation of fines. Thus, when such a shaping technique is to be employed, it is usually preferable to terminate the intimate mixing of the latex and electrolyte solution in the mixing device prior to the stage when a homogeneous, form-sustaining paste is obtained and then complete working of the coagulum to the desired consistency during the shaping step.

According to a preferred embodiment of the invention, shaped units of a homogeneous, form-sustaining coagulum are prepared by continuously feeding a polymeric latex and an electrolyte solution through separate inlets into an extruder-mixer having a simple, deep-flighted screw of small helix angle at rates such as to maintain a substantially constant latex/electrolyte solution ratio in the extruder, operating the extruder at a screw speed sufficient to accomplish thorough admixture of the latex and electrolyte solution during the residence time in the extruder, and extruding the resultant homogeneous form-sustaining paste through a suitable exit orifice, e.g., an orifice having the diameter desired for the shaped units or an orifice provided with a crossed-wire dicer having the wires spaced so as to form openings having the desired cross-section. Since the shaped units can be allowed to drop into the aqueous bath in which hardening and syneresis are to be accomplished, this coagulation-shaping technique-in addition to permitting the formation of shaped units of coagulum under minimum shear conditions-has the advantage of allowing the shaped units to be introduced into the hardening-syneresis bath without manual or mechanical handling, thus minimizing fines formation. An additional advantage of this coagulation-shaping technique is that it permits the formation of hollow shaped units, which can be completely hardened and synerized more quickly than solid shaped units of comparable cross-section.

During coagulation and shaping, the temperature conditions are not critical: coagulation can be accomplished at any temperature above the freezing temperature and below the boiling temperature of the latex; shaping can be accomplished at any desired temperature. Thus, the initial stages of the present process are conducted at any convenient temperature, frequently at room temperature or at another temperature in the 5°-30° C. range. During hardening and syneresis, on the other hand, it is critical to maintain the aqueous bath at a temperature at least as high as the heat distortion temperature of the polymer, because no appreciable amount of hardening and syneresis can be accomplished unless the temperature is at least this high. Any temperature above this minimum temperature can be employed, and it is usually preferable to conduct the major portion of the hardening and syneresis at temperatures above the heat distortion temperature of the polymer in order to reduce the time required for complete hardening and syneresis. When temperatures above about 100° C. are desired, hardening and syneresis are conducted under pressure in order to maintain the bath in the liquid phase. Unless the polymer has too high a heat distortion temperature to be hardened and synerized at such temperatures, it is usually preferable to employ temperatures in the range of about 90°-100° C., more preferably about 95°-100° C., in order to accomplish the maximum amount of hardening and syneresis in a minimum time without having to use pressure equipment.

Although, as mentioned above, the coagulum cannot contain more than about 5% free latex, tolerable amounts of free latex are sometimes present in the shaped units. Therefore, it is sometimes desirable to dissolve a minor amount of an electrolyte in the aqueous bath to cause coagulation of the free latex during hardening and syneresis of the shaped units.

Hardening and syneresis in the aqueous bath are continued at least until the interior portions of the shaped units have been hardened and the desired amount of water has been forced from the shaped units by coalescence of the polymer particles, i.e., syneresis. The time required to achieve the desired results naturally varies considerably with the cross-section of the shaped units, the temperature employed, and the amount of syneresis desired but is easily determinable by routine experimentation or heat transfer calculations. As a guide in determining the time required, it might be noted that (1) polymers having lower heat distortion temperatures harden more rapidly at a given temperature, (2) thicker shaped units require longer heating times for complete hardening at a given temperature, (3) higher temperatures decrease the time required to complete hardening of the shaped units and any given degree of syneresis and also permit more complete syneresis, and (4) the amount of syneresis which should be accomplished depends largely on the load capacity of the drier to be employed, since less syneresis is required when the drier has a large load capacity. Heating times of about 30-300 minutes are advantageously employed when shaped units of a polymer having a heat distortion temperature of about 65°-75° C. have a cross-section of about 0.05-5 inches and are hardened and synerized at about 90°-100° C.

When latex solids are being recovered by a continuous process, the aqueous hardening-syneresis bath is agitated sufficiently to keep the shaped units in suspension during hardening and syneresis and permit easy transfer of the shaped units to another aqueous bath, a granulator, or a centrifuge by overflow through a suitable conduit. Since a continuous process technique results in a non-uniform residence time of the shaped units in a single aqueous bath, complete hardening and syneresis of the shaped units should be insured by increasing the average residence time in a single bath or, more advantageously, by employing a series of two or more aqueous baths to make the average residence time more uniform.

The final stages of the present latex solids recovery process can be conducted by conventional techniques. Thus, the hardened, synerized shaped units, when they do not already have a particle size suitable for washing and drying, can be granulated to the desired particle size (usually at least as small as about 4 mesh, with the majority of the particles being about 4–60 mesh) in any suitable apparatus. The polymer having the desired particle size is washed one or more times to remove water-soluble contaminants, separated from the wash water (usually by screening or centrifuging), and dried advantageously in a warm air rotary drier or a fluid bed drier.

Coagulating, shaping, hardening, and synerizing a polymer in accordance with the present invention-even when the polymer has a heat distortion temperature about 65° C.-result in the formation of a coagulum which is strong enough to permit control of the particle size and particle size distribution obtained by granulation, thus permitting a particle size suitable for adequate washing and drying to be obtained with a minimum coformation of fines to be recycled. Whether the particle size suitable for washing and drying is achieved by shaping the homogeneous, form-sustaining coagulum into units having a sufficiently small particle size or by granulating larger shaped units after completion of the hardening-syneresis step, the practice of the invention provides a coagulum which is strong enough to resist break-up during washing, granulation and conveying thus minimizing the proportion of the fines-fraction to be recycled, hence, substantially reducing the fines-fraction of the polymeric particles to be dried and increasing the efficiency and safety of the drying step.

EXAMPLE 1

CONTROL 1380 parts of a first latex having about 33% by weight solids of a butadiene/acrylonitrile substrate polymer (93/7) grafted with a styrene/acrylonitrile superstrate polymer (70/30) wherein said superstrate/substrate ratio is about 150/100 was blended with 103 parts of a second latex of 33% solids having the same substrate and superstrate composition with the superstrate to substrate ratio being about 40/100. The combined latices were mixed with 250 parts of a 1.5% aqueous solution of $MgSO_4$ according to the following procedures.

Feed the latex and coagulant charges at constant rates proportional to the volumes of the charges through separate inlets into a suitable extruder having a barrel diameter of 1.5 inches, a simple deep-flighted screw of small helix angle rotating at 1800 r.p.m., and a length such that formation of a homogeneous, form-sustaining paste by intimate admixture of the charges is accomplished shortly before the coagulum reaches the exit orifice of the extruder when the screw is rotated at 1800 r.p.m. Allow the extrudate, which is in the form of compressed helical springs having a cross-section of 1.5 inches, to drop into a mildly agitated aqueous bath containing 0.5 part of MgSO$_4$, maintained at a temperature of 98°-100° C. Retain the coagulum in the aqueous bath until the minimum residence time is 40 minutes, and then feed the aqueous slurry of coagulum to a rotary blade granulator equipped at its exit orifice with a screen having openings 0.25 inch in diameter. The granulator effluent is passed through a 60 mesh screen with +60 mesh particles passing to a wash tank followed by centrifuging and drying. The −60 mesh material passed through the screen and was collected on a rotary vacuum filter followed by washing removal and drying. The (−60) fines-fraction was found to be about 9.5% of the total solid particles recovered.

EXAMPLE 2

Example 1 was repeated except that the fines-fraction collected on the vacuum filter was washed, slurried and dispersed in the mixed latices of Example 1 in a stirred tank. The mixed latex containing the fines-fraction was then processed as in Example 1. The (−60) frines-fraction was found to be about 7.5% of the total solid particles recovered.

It is evident from the analysis that the fines-fraction was taken up by the coagulated latex and unexpectedly reduced the fines-fraction to be recirculated in the system.

What is claimed is:

1. In a process for recovering solids with a reduced fines-fraction from an aqueous polymeric latex comprising a grafted conjugated diene polymer wherein said diene polymer is a substrate grafted with a superstrate polymer of a monomer formulation comprising a monovinylidene aromatic and an acrylic monomer, wherein said process comprises: (a) mixing said latex with an aqueous electrolyte solution until a homogeneous form-sustaining paste is obtained, (b) forming said paste into at least one shaped unit, (c) heating said shaped paste unit in an aqueous medium maintained at a temperature at least as high as the heat distortion temperature of the superstrate polymer to synerize and harden said paste units into polymeric particles, (d) removing said polymer particles from said aqueous medium, and (e) drying said particles, the improvement which comprises:

(f) separating a portion of said polymer particles as a fines-fraction in step (d) and (g) dispersing said fines-fraction into at least a portion of said latex at a location prior to step (a), maintaining the rate of dispersion in step (g) at a rate sufficient to recycle a predetermined amount of said fines-fraction separated in step (f).

2. A process of claim 1 wherein said monovinylidene aromatic monomer is styrene, alpha-methyl styrene, chlorostyrene and bromostyrene or mixtures thereof.

3. A process of claim 2 wherein said monovinyl aromatic monomer is styrene.

4. A process of claim 1 wherein said acrylic monomer is acrylonitrile, methacrylonitrile, alkyl acrylates and alkyl methacrylates or mixtures thereof.

5. A process of claim 4 wherein said acrylic monomer is acrylonitrile.

6. A process of claim 1 wherein said monomer formulation is styrene and acrylonitrile.

7. A process of claim 1 wherein said conjugated diene polymer is polybutadiene, chloroprene and copolymers of butadiene or mixtures thereof.

8. A process of claim 1 wherein said diene polymer is polybutadiene.

9. A process of claim 1 wherein said diene polymer is a copolymer of butadiene-styrene, butadiene-acrylonitrile or mixtures thereof, said copolymers having 50 to 97% butadiene by weight.

10. A process of claim 1 wherein said grafted diene polymer comprises a butadiene polymer grafted with a monomer formulation comprising about 20 to 95% styrene by weight and about 5 to 80% acrylonitrile by weight, said diene rubber moiety being about 10 to 85% by weight of said grafted diene polymer.

11. A process of claim 1 wherein said polymeric latex has about 25 to 65% by weight of grafted diene polymer.

12. A process of claim 1 wherein said electrolyte solution is a solution of a metal salt.

13. A process of claim 1 wherein said particles have a cross-section of about 0.2 to 2 inches.

14. A process of claim 1 wherein said synerizing and hardening is carried out in the aqueous bath maintained at a temperature above the heat distortion temperature of said grafted superstrate.

15. A process of claim 1 wherein the heat distortion temperature of said superstrate polymer is above about 65° C.

16. A process of claim 1 wherein said polymeric latex is a mixture of a first and second grafted diene polymer wherein said first grafted diene polymer has about 10-40 parts of grafted superstrate polymer and said second grafted diene polymer has about 40-150 parts of superstrate polymer per 100 parts of diene polymer.

17. A process of claim 1 carried out by simultaneously feeding said polymeric latex, containing said fines-fraction, and said aqueous electrolyte solution into an extruder means, mixing and coagulating said latex to a form-sustaining paste and extruding said paste through an orifice having a cross-section of at least 0.05 inches.

18. A process of claim 1, carried out by simultaneously feeding said polymeric latex, said fines-fraction and said aqueous electrolyte into an extruder means, mixing and coagulating said latex to incorporate said fines-fraction into a form-sustaining paste through an orifice having a cross-section of at least 0.05 inches.

19. A process of claim 1 wherein said removing is carried out by passing said polymeric particles in said aqueous medium through a separation means such that said fines-fraction passes through and is collected on a filter means separating said fines-fraction from said polymeric particles.

20. A process of claim 19 wherein said separation means is a screen of about 60 mesh passing said fines-fraction, smaller than 60 mesh, to a vacuum filter.

21. A process of claim 20 wherein said fines-fraction is collected on said vacuum filter as a filter cake, washed and dispersed in said latex.

22. A process which comprises mixing a polymeric latex of a grafted butadiene polymer wherein said butadiene polymer is a substrate grafted with a superstrate copolymer of a monomer formulation comprising styrene and acrylonitrile with an aqueous electrolyte solution until a homogenous form-sustaining paste is obtained, forming said paste into at least one shaped unit having a minimum cross-section of about 0.05 to 5.0 inches, heating said shaped paste unit in an aqueous medium at a temperature of about 65° to 100° C. to synerize and harden said paste units into polymeric particles, removing said polymeric particles from said aqueous medium and drying said particles, the improvement comprising separating a portion of said polymeric particles as a fines-fraction and dispersing said fines-fraction into at least a portion of said latex at a location prior to mixing with said aqueous electrolyte, maintaining the rate of dispersion of said fines-fraction in said latex at a rate sufficient to recycle said fines-fraction separated.

* * * * *